UNITED STATES PATENT OFFICE.

CHARLES F. SPIEKER, OF NEW YORK, N. Y.

IMPROVEMENT IN PREPARING MANURE-BEDS.

Specification forming part of Letters Patent No. 19,974, dated April 13, 1858.

*To all whom it may concern:*

Be it known that I, CHARLES F. SPIEKER, of the city, county, and State of New York, have invented a new and useful Process of Condensing and Fixing Ammonia in Fertilizers of the Soil; and I do hereby declare that the following is a full, clear, and exact description of the same.

It has been known for some time past to chemists that iron, when it has been rusted or oxidized by the atmospheric air and water, contains frequently a small quantity of ammonia; likewise that the same substance is very often found to exist in aluminous earths or minerals. Consequently I do not claim to have discovered the fact that oxide of iron or aluminous earths are absorbents of ammonia; but, based upon this principle, I have invented a new and improved method, for which I desire to secure Letters Patent, by which I produce the ammonia in the form of a salt, of such a composition and in such quantity that it may be used with other substances in mixture with it as a most effective and valuable fertilizer for plants or crops, proved by practical experience, and thus form an article of commerce. At the same time, by this process, it is found that ammonia, coming in close contact in its nascent state with aluminous earths, by the means of which and with other substances it is condensed and fixed, acts as a solvent on the silicates invariably contained in the aluminous earths used for this purpose. In this way I produce by the same process the silicates of alumina and potash in a soluble form, which is of the greatest importance for the purpose of being absorbed and assimilated by plants.

The minute small quantities of ammonia which the oxides of iron and the aluminous earths contain in their natural state, although exposed to the action of the air for such a length of time, shows that their power of absorbing it by themselves alone is very small, and that it requires the addition of other substances and the application of a peculiar process to produce, condense, and fix ammonia in such large quantity that it may be used with pecuniary advantage for fertilizing purposes. The leading features of this process are the following:

A quantity of the aluminous earths—say from one to several tons or less—is made into a bed or layer and exposed to the free action of the air, but protected from the rain and excess of temperature either from the solar or artificial heat. The most simple way of protecting those beds when the process is being carried on in the open air is by boards constructed into open sheds. Those beds are subjected to the repeated process of evaporation. For this purpose water is from time to time added and mixed with the mass of aluminous earth and the substances which have been previously incorporated with it, and are added from time to time as required. The particulars of this process and operation I will now describe, saying, previously, that the action of the aluminous earths consists in absorbing and condensing the ammonia from the air or when it is being evolved from other sources—for instance, from animal substances.

The aluminous earths which I generally use consist of different silicates of alumina mixed with other silicates, as silicate of potash, soda, and silicate of iron. Great care is to be exercised, however, in the choice of the material, which, when it is being made in the beds or layers, ought to be in a state of coarse powder, sufficiently porous not to prevent the access of the air through the whole mass, but not as fine or plastic, like potter's clay, which would prevent this. Still, the powder ought not to be too coarse, as the aluminous earths act in this case like other spongy substances in condensing gases—for instance, like platina-sponge with air and hydrogen gas. No other silicate of alumina have I found so well adapted for this purpose as the green sand generally called "marl." At the locality where it is found this is a silicate of alumina, together with the silicate of iron and potash, of which latter it contains a large percentage. Ground clay, slate, and similar minerals may likewise be used for the above purpose, although with not so much pecuniary advantage as the green sand. The material to be used to make those beds or layers of aluminous earth may consist of different kinds of floors paved with bricks, slate laid upon boards, or even boards alone. They must be so constructed as to give good access to the air, and the material of which they are made ought not to be porous, so as to absorb the salt of ammonia if, perchance, by moistening the mass too much water should have been poured on. Burned plaster-of-paris made into a paste with water answers also very well for a floor. The beds of aluminous earths may be laid even on the bare ground, if well protected, though not with the same advantage. When the ammonia by this process is now to be absorbed from the air or produced by the oxidation of iron or higher oxidation of the protoxide of iron, the aluminous earths, on laying it down, are to be mixed with certain acids or such salts, the acid of which has a greater affinity for ammonia than the base with which it is combined. Both acids and salts have to be used in a highly-diluted state. In general I prefer much to use salts instead of acids, particularly when the aluminous earths contain carbonate of lime, which is mostly the case. The action of the acid is then too sudden on the lime, and too much carbonic acid is being lost. For acids, I use principally sulphuric acid diluted with ten parts of water, although other acids—as muriatic or even organic acids—may be used. When I use salts I use mostly the protosulphate of iron, known as "copperas;" sometimes alum, each diluted with from five to six parts of water.

In the mixing of aluminous earths with the diluted acids or solution of copperas, care has to be taken not to put on too much of the liquid at once, so as to form a thin paste, which by drying will change into a hard paste. The mass is now left in the drying state, either in the open air by the solar heat or by artificial higher temperature. Too great heat must ever be avoided, particularly solar heat, which seems to prevent the absorption of ammonia altogether. When the mass is quite dry, it is moistened again throughout with diluted solution of the salts or acids above named, and this process of drying and moistening the mass is repeated until the percentage of the salt of ammonia is sufficiently large for the purpose intended. It will be found to increase in regular proportion with every drying and moistening of the mass.

The explanation of the producing of the salts of ammonia by this process is this: When carbonate of lime is present in aluminous earths, it is decomposed by the protosulphate of iron, forming sulphate of lime and protocarbonate of iron. This latter loses its carbonic acid immediately, which, in the moment of being set free, unites with the ammonia from the air absorbed and condensed by the aluminous earth. Or it may be explained that the protocarbonate of iron decomposes the water, the oxygen of the water changes the protoxide into the oxide of iron, while the hydrogen unites with the nitrogen of the air, forming ammonia, which combines with the carbonic acid set free. When no carbonate of lime is present, or when, instead of copperas, alum or sulphuric acid is being used, it may be presumed the ammonia of the air enters into direct combination with the sulphuric acid. Perhaps both kinds of actions take place, as the salts of ammonia formed consist of the sulphate and carbonate of ammonia. By using sulphuric acid and metallic iron the same result will be obtained as when copperas in the form of a salt is used. The metal iron having been mixed previously with the aluminous earth on the beds, if the aluminous earth contains sulphate of iron, copperas will likewise be formed by exposure to the air, and in this way the products of ammonia found in the aluminous earth in its natural state may be explained.

If the carbonate of lime contained in the aluminous earth consists of marine shells, as is the case with the green sand, it is of great advantage, for the production of ammonia will be greatly increased by the decomposition of organic substance yet remaining in the fossil shells, which is condensed and fixed by the aluminous earth, by acids, and salts. If ammonia is to be produced altogether only by the decomposition of animal substances, the process of condensing and fixing ammonia, changing it into a salt by means of aluminous earth and the use of acids or salts, is entirely the same. The animal substance is mixed with aluminous earth, when that is made into beds. As soon as the decomposition takes place and ammonia is being formed, acids—for instance, sulphuric acid—or salts—as copperas or sulphate of iron in the same diluted state as mentioned above—are mixed with the mass. The process of evaporation is repeated, as described above, and in this way ammonia produced by animal substances in gaseous form is being fixed and condensed and changed into salts.

The choice of the animal substance which I use depends upon the pecuniary price at which they can be obtained. The blood of slaughtered animals, fish, and other marine animals answers very well to produce the salts of ammonia by this process, if cheaply enough procured; but particularly adapted for it in pecuniary respect is the gelatine obtained from bones when they are dissolved in sulphuric acid for the purpose of making the biphosphate of lime for fertilizing purposes. The action of the sulphuric acid and water, if done in the usual way and proper manner, changes the bones into a soft paste and sets gelatine free. This mass is mixed with the aluminous earth on the beds and subjected to the above-described manipulation. The result is that the gelatine changes into ammonia, that unites with the phosphoric acid of the biphosphate of lime as phosphate of ammonia, changing the bi into the neutral phosphate of lime.

While I disclaim distinctly the discovery of the fact that ammonia is absorbed to a small extent by oxides of iron and aluminous earth in their natural state, or that it is produced by the decomposition of animal substances in contact with air and water, what I now claim as my peculiar invention, which I desire to secure by Letters Patent, is—

The use of the peculiar process by which I produce, condense, and fix ammonia in ammonia-beds made of aluminous earth, silicates of alumina, or the oxides of iron, sheltered from the rain and excessive temperature, and charged with diluted acids or weak solutions of such salts for the acid of which ammonia has a greater affinity than the base with which it was combined, in the manner and for the purpose set forth.

CHARLES F. SPIEKER.

Witnesses:
S. H. WALES,
JNO. W. HAMILTON.